US011857476B2

(12) United States Patent
Karl et al.

(10) Patent No.: US 11,857,476 B2
(45) Date of Patent: Jan. 2, 2024

(54) LIGATURE RESISTANT WARDROBE

(71) Applicants: Richard Karl, Naples, FL (US); Scott Karl, Geneva, IL (US); Kurt Staskon, Orland Park, IL (US)

(72) Inventors: Richard Karl, Naples, FL (US); Scott Karl, Geneva, IL (US); Kurt Staskon, Orland Park, IL (US)

(73) Assignee: Norix Group, Inc, West Chicago, IL (US)

( * ) Notice: Subject to any disclaimer, the term of this patent is extended or adjusted under 35 U.S.C. 154(b) by 0 days.

(21) Appl. No.: 17/513,071

(22) Filed: Oct. 28, 2021

(65) Prior Publication Data

US 2022/0047439 A1 Feb. 17, 2022

Related U.S. Application Data

(63) Continuation of application No. 16/260,050, filed on Jan. 28, 2019, now Pat. No. 11,219,565, which is a continuation of application No. 15/583,955, filed on May 1, 2017, now Pat. No. 10,507,150, and a continuation of application No. 15/868,091, filed on Jan. 11, 2018, now Pat. No. 10,575,642, said application No. 15/583,955 is a continuation of application No. 13/450,508, filed on Apr. 19, 2012, now Pat. No. 9,661,933, which is a continuation of application No. 13/186,853, filed on Jul. 20, 2011, now abandoned, which is a continuation of application No. 11/868,308, filed on Oct. 5, 2007, now Pat. No. 8,007,059.

(51) Int. Cl.

*A61G 7/047* (2006.01)
*A47C 19/22* (2006.01)
*A47C 31/00* (2006.01)
*A61G 7/05* (2006.01)

(52) U.S. Cl.

CPC .............. *A61G 7/047* (2013.01); *A47C 19/22* (2013.01); *A47C 31/00* (2013.01); *A61G 7/05* (2013.01)

(58) Field of Classification Search

CPC .......... A61G 7/047; A61G 7/05; A47C 19/22; A47C 31/00; A47C 19/021

See application file for complete search history.

(56) References Cited

U.S. PATENT DOCUMENTS 3,150,032 A * 9/1964 Rubenstein ........... B29C 70/086 52/223.13
3,314,741 A * 4/1967 Litner .................... A47B 67/00 312/351
3,556,586 A * 1/1971 Beardmore .............. A47D 1/04 297/DIG. 2
3,848,925 A * 11/1974 Harder, Jr. ............. B60N 2/242 297/DIG. 2
4,826,265 A * 5/1989 Hockenberry ....... A47B 96/021 292/148

(Continued)

*Primary Examiner* — Hanh V Tran
(74) *Attorney, Agent, or Firm* — James D Palmatier; Applied Patent Services, PC

(57) ABSTRACT

The invention is directed to a molded, hollow, ligature resistant wardrobe comprising a ligature resistant top portion, a ligature resistant coat hanger support and a shelf. A door may be attached to enclose a storage shelf and the igature resistant coat hanger support. The igature resistant coat hanger support having a closed hanger hook engagement recess to prevent providing a ligature tie off point. The ligature resistant top portion may have a sloping shape extending from a back to a front.

17 Claims, 12 Drawing Sheets

(56) References Cited

U.S. PATENT DOCUMENTS

| | | | | | |
|---|---|---|---|---|---|
| 4,843,975 | A * | 7/1989 | Welsch | A47B 96/021 | 211/188 |
| 5,100,204 | A * | 3/1992 | Makihara | B60N 2/682 | 264/516 |
| 5,188,246 | A * | 2/1993 | Maxworthy | A47B 96/021 | 211/90.01 |
| 5,374,118 | A * | 12/1994 | Kruck | F25D 23/064 | 220/592.2 |
| 5,375,914 | A * | 12/1994 | Donnelly | A47C 1/121 | 297/335 |
| 5,573,322 | A * | 11/1996 | Wrobel | A47B 96/021 | 211/153 |
| 5,588,370 | A * | 12/1996 | Longley | A47B 96/022 | 108/42 |
| 5,738,423 | A * | 4/1998 | Alfaro | B25H 1/12 | 312/249.11 |
| 5,857,742 | A * | 1/1999 | Karl | A47C 13/005 | 297/DIG. 2 |
| 5,879,115 | A * | 3/1999 | Medal | B29C 65/562 | 156/423 |
| 6,092,885 | A * | 7/2000 | James | A47B 19/00 | 312/249.8 |
| 6,663,200 | B1 * | 12/2003 | James | A47B 19/00 | 312/249.8 |
| 6,783,184 | B2 * | 8/2004 | DiBattista | B29C 49/20 | 297/DIG. 2 |
| D510,486 | S * | 10/2005 | Karl | D6/334 | |
| 6,952,851 | B1 * | 10/2005 | Mahoney | A47C 27/081 | 5/706 |
| 7,117,611 | B2 * | 10/2006 | Park | A47K 10/48 | 34/235 |
| 7,255,403 | B2 * | 8/2007 | Butler | B63B 29/04 | 297/440.13 |
| 7,273,571 | B2 * | 9/2007 | Laws | B29C 44/12 | 264/46.7 |
| 7,287,816 | B1 * | 10/2007 | Karl | A47C 5/125 | 297/452.59 |
| 8,210,356 | B1 * | 7/2012 | Krull | A47B 21/00 | 206/214 |
| 10,575,642 | B2 * | 3/2020 | Karl | A47B 55/00 | |
| 2002/0092818 | A1 * | 7/2002 | Craft | A47B 96/021 | 211/186 |
| 2002/0117944 | A1 * | 8/2002 | Chen | A47B 47/0075 | 312/249.11 |
| 2005/0040680 | A1 * | 2/2005 | Tally | A47C 12/00 | 297/118 |
| 2007/0007799 | A1 * | 1/2007 | Tally | B25H 5/00 | 297/118 |
| 2007/0262622 | A1 * | 11/2007 | Tally | B25H 5/00 | 297/183.3 |

* cited by examiner

LIGATURE RESISTANT WARDROBE

RELATED APPLICATIONS

This application is a continuation of U.S. Non-Provisional application Ser. No. 16/260,050, filed Jan. 28, 2019, entitled Intensive Use Shelf which is a continuation of U.S. Non-Provisional application Ser. No. 15/868,091 entitled Intensive Use Shelf now U.S. Pat. No. 10,575,642 B2, issued Mar. 3, 2020, and U.S. Non-Provisional application Ser. No. 15/583,955, filed May 1, 2017 entitled Intensive Use Bed now U.S. Pat. No. 10,507,150 B2 issued Dec. 17, 2019 which is a continuation of Non-Provisional application Ser. No. 13/450,508 filed Apr. 19, 2012, now U.S. Pat. No. 9,661,933 B2 issued May 31, 2017, entitled Intensive Use Bed which is a continuation of Non-Provisional application Ser. No. 13/186,853 filed Jul. 20, 2011 entitled Intensive Use Furniture now abandoned which was a continuation of patented Non-provisional application Ser. No. 11/868,308 filed Oct. 5, 2007, now U.S. Pat. No. 8,007,059 B2 issued Aug. 11, 2011 entitled Intensive Use Furniture. This application incorporates by reference the disclosure of each of these applications and patents.

FIELD OF THE INVENTION

The Intensive Use Shelf Present invention relates generally to intensive use furniture for use in institutional settings such as prisons, jails, detention centers and psychiatric facilities. And more particularly to furniture for use by individuals where using a ligature resistant shelf to store belongings. The ligature resistant shelf comprising a sloped top and a ligature resistant hanger engagement and a contraband barrier generally to intensive use shelving furniture for use in institutional settings such as prisons, jails, detention centers and psychiatric facilities. And more particularly to furniture for use by individuals where a ligature resistant design and a contraband barrier are used to protect individuals.

BACKGROUND OF THE INVENTION

Intensive use furniture is designed for use in demanding environments. Facilities housing individuals for rehabilitation from health or legal problems require furniture for safely furnishing living quarters while being durable.

Intensive use furniture was formerly made of steel or wood. In previous years, fiberglass construction was used to replace wood and metal. Fiberglass offered a more appealing aesthetic than steel or wood, and more resistant to damage by the user and damage by bodily fluids. Wood furniture, for example is known to have problems with bed bugs in these settings. Fluids can rot and damage wood furniture resulting in weakness and creating odors. Fiberglass however, had several limitations. Fiberglass cracked and splintered if a direct force was applied. Manufacturing fiberglass furniture was very slow and involved custom production.

Intensive use furniture for such facilities requires durability and ease of cleaning. Furthermore, it is desired that furniture used in such intensive use facilities prevent improper use of that furniture by the user such as concealing items within or underneath the furniture. An inmate in a correctional or psychiatric facility may try to hurt themselves or others with ligatures, drugs, weapons or other contraband hidden behind furniture. The structure of the furniture must avoid all of these problems.

In addition, intensive use furniture is usually fixed to the floor or walls. This fixture must be relatively simple, secure and preferably sealing the seams between the furniture and the adjoining surface. Preferably, the fixation method is provided with a means for preventing tampering by the user of the furniture. Securing the furniture to the floor or wall further reduces the safety concerns on both the prisoners or patients and staff resulting in a safer environment.

It is desirable to provide furniture for such facilities having durability, aesthetically pleasing characteristics and design for comfortable use. Therefore there is a need to provide an intensive use furniture product without using assembly fasteners and having more impact-resistance, less weight and with much greater load-bearing capacity than fiberglass, wood or metal construction furniture. The furniture must sealingly attach to a mounting surface such as a wall or floor.

BRIEF SUMMARY OF THE INVENTION

One embodiment of the present invention is directed to a line of furniture for use in demanding environments, comprising components for use in individual's cell or room, as well as use in common areas such as a bed, night stand, wardrobe, desk, footstool and wall shelving units. The individual components are rotationally molded using a flame retardant linear low-density polyethylene with a hollow or honeycomb interior and may be filled with polyurethane foam for increased durability and sound absorption. The components comprise a shell having a mounting surface, the mounting surface having an outer edge surrounding the shell. The mounting surface is adapted for sealingly attaching to a structural element such as a wall or floor. The shell is attached to the wall or floor by an attachment means such as threaded fastener extending though a bolt hole in the mounting surface wherein an insert of metal or hard plastic may be inserted in the bolt hole for support. Generally horizontal surfaces on shelves, wardrobes, and the like are formed to gently slope downward away from a support wall to prevent the user from placing items on top of the furniture and to resist supporting a ligature or climbing on top of the furniture. The mounting surface includes a contraband barrier for sealing seams between the mounting surface of the shell and the wall, floor or furniture component by a caulk channel formed around the entire perimeter of the mounting surface to isolate the interior portion of the mounting surface from fluids, contraband, weapons or other materials and contraband at the outer edge. The caulk channel in the mounting surface is adapted to receive a bead of caulk for forming a fluid resistant barrier between the furniture and the adjoining wall or floor surface. The bolt holes may be concealed by covers affixed over the bolt holes by adhesive or the like forming a smooth or recessed outer surface of the shell over the fasteners protecting the structural attachment to the floor or wall.

DETAILED DESCRIPTION OF THE INVENTION

Figure 2:
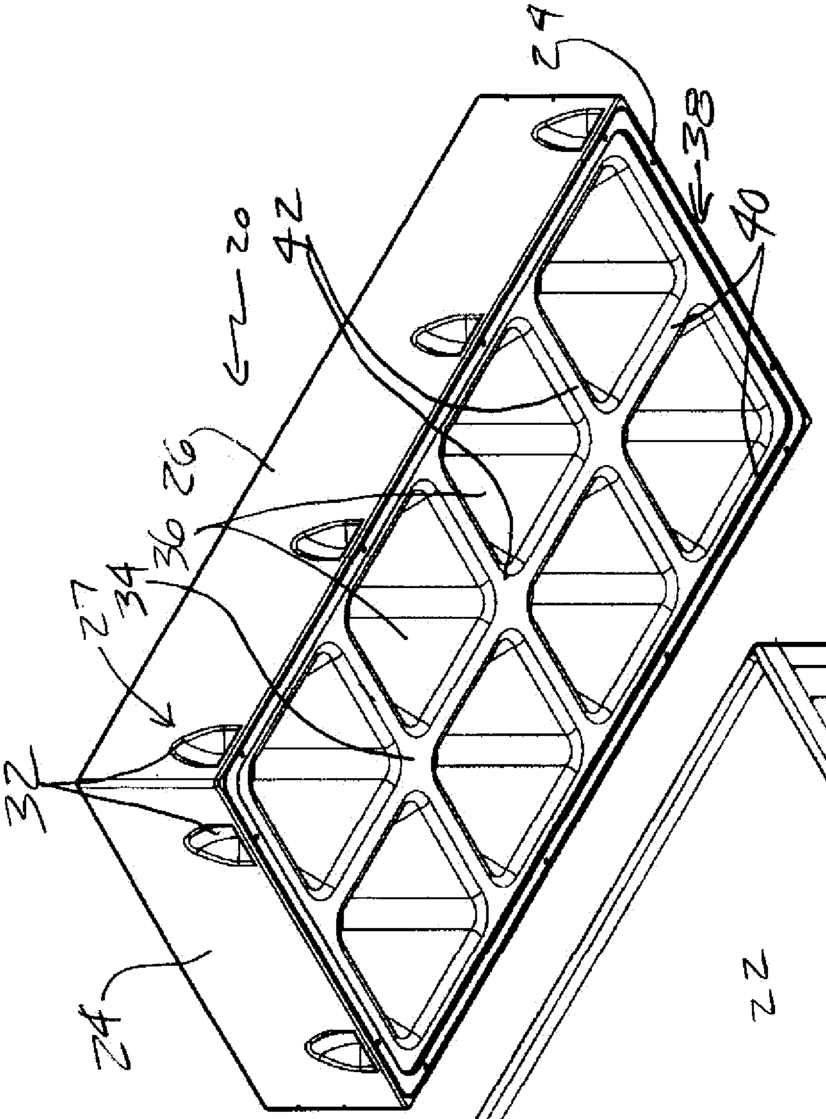
FIG. 2 is a perspective view of the underside of the intensive use bed of FIG. 1.
Figure 1:
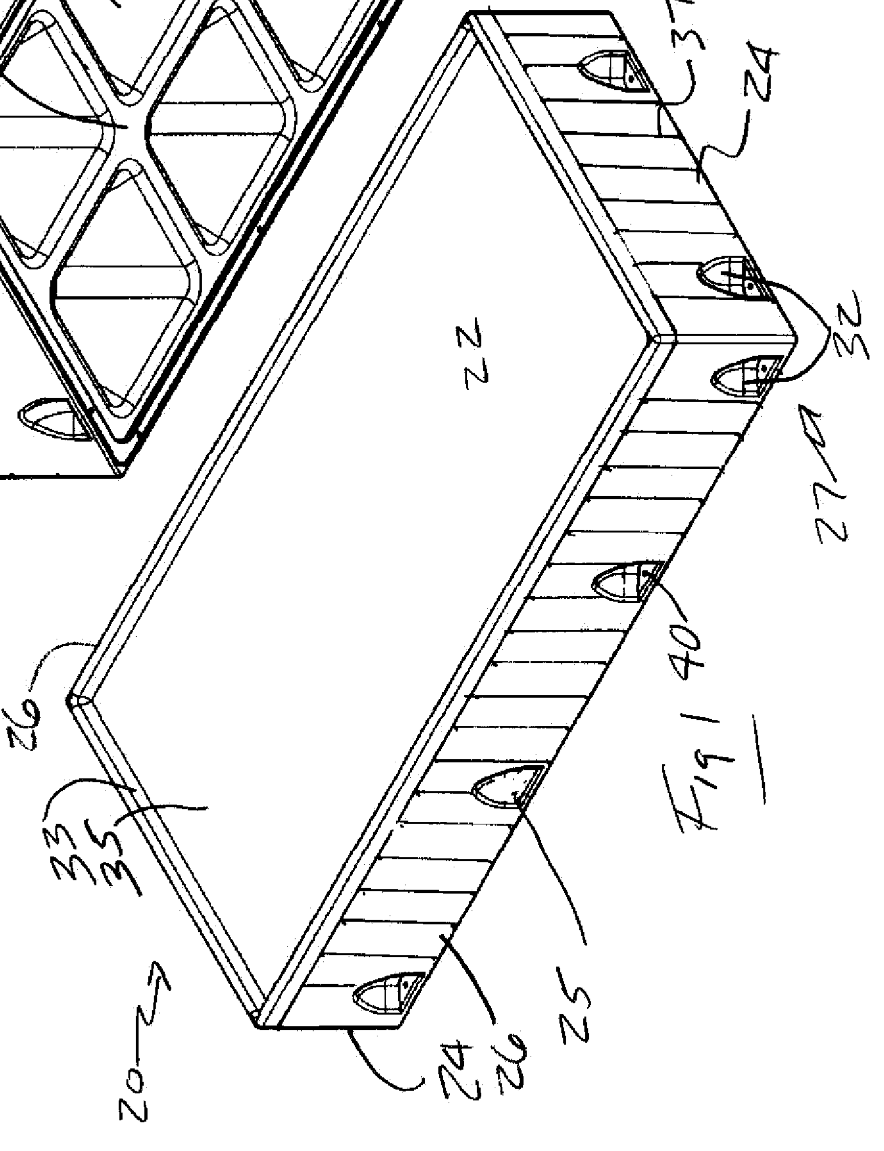
FIG. 1 is a perspective view of an first embodiment of an intensive use bed
Figure 4:
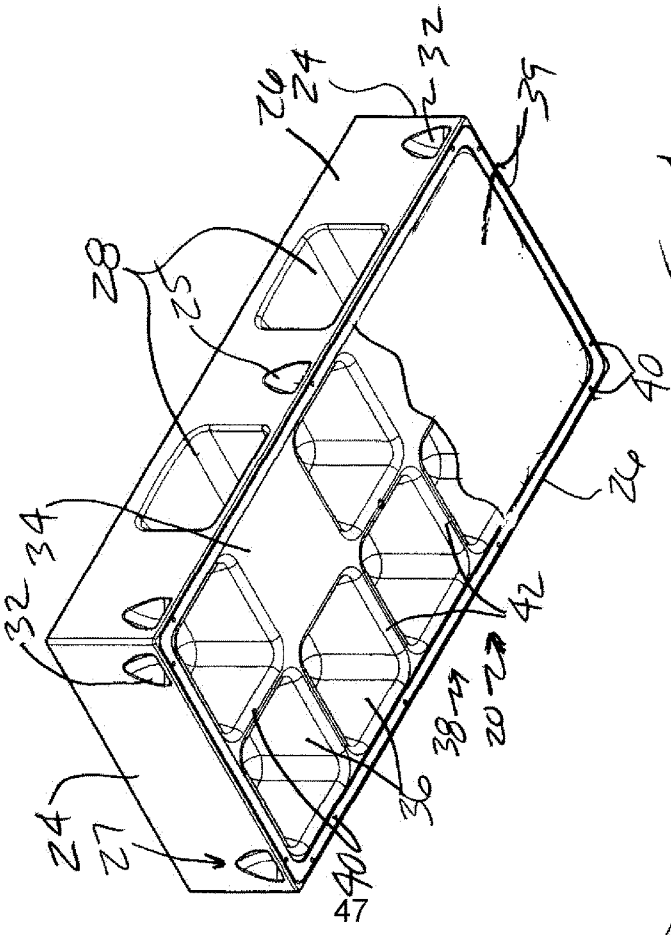
FIG. 4 is a perspective view of the underside of the intensive use bed of FIG. 3.
Figure 5:
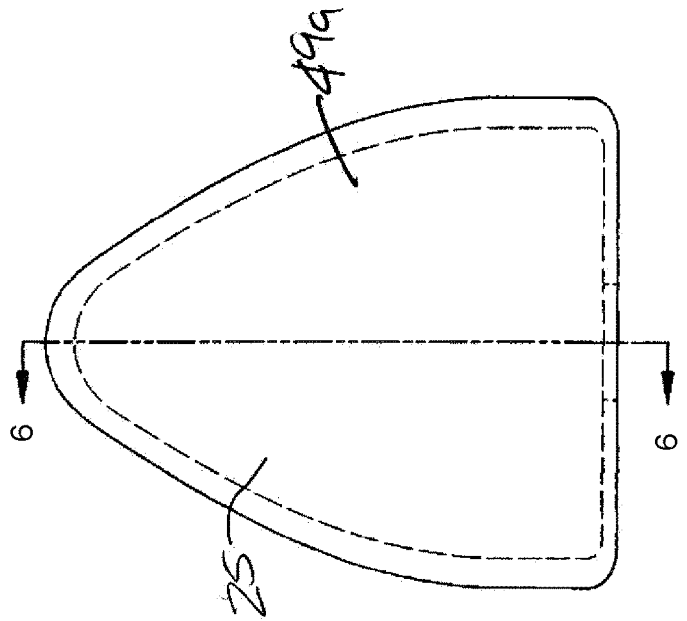
FIG. 5 is a front plan view of a first embodiment of a fastener cover of FIG. 1.

FIGS. 1 through 4 illustrate an intensive use furniture component shown as a first and second embodiment of a bed 20. Referring to a FIGS. 1 and 3, the bed 20 is rectangular having a top surface 22, a pair of end side walls 24 and a front and rear side walls 26. The bed 20 has an attachment means 27 formed in the end, rear and front walls 24, 26. The attachment means may comprise a plurality off fastener pockets 32 disposed in spaced relation on the end surfaces and front and rear surfaces for receiving fasteners (not shown) therein for extending through the shell to attach the bed 20 to the floor F (FIG. 5). The top surface 22 has a ridge 33 surrounding the support portion 35 forming a recessed pocket on the top of the bed. The ridge and support surface form a recessed pocket as a means for locating a mattress (not shown) as well as containing the seepage of bodily or other undesirable fluids within the ridge 33. Each of the surfaces may have a contoured or smooth non-penetrable outer shell for resisting penetration by fluids. A cover 25 may be placed over the fastener pockets 32 to protect the fasteners from the user and to prevent fluid from seeping into the pockets or contraband being placed in the fastener pocket 32. Referring to FIGS. 2 and 4, the intensive use bed 20 is shown in a bottom perspective view. The intensive use bed 20 has a bottom surface 34 forming the mounting surface for attaching the bed to a floor F (FIG. 5). The bottom surface is formed comprising a plurality of openings 36 forming a honeycomb structure 38 to improve strength and reduce the weight of the bed 20. A bottom plate 39 may be plastic welded or adhesively attached over the bottom surface 34 to cover the openings 36 to increase strength and to prevent contraband or fluid from residing in the openings, for example if the bed is not attached to the floor. The honeycomb structure 38 comprises a plurality of end support beams 40 extending between the end walls 24. The honeycomb structure 38 further comprises the plurality of edge support beams 42 extending between the front walls 26 and the rear walls forming a plurality of chambers 43 (FIG. 6) enclosed in the shell of the bed and open recesses 36 opening to the bottom surface 34.

As illustrated in FIGS. 1 to 4, the outer walls 24, 26 may have contoured ridges 37 formed in the surface to provide ridges for support of the walls and improve the aesthetic appearance of the bed. The fastener pockets 32 formed in the outer walls 24, 26 are generally scalloped shaped. A fastener hole 40 is formed in the fastener pocket 32 to accommodate a fastener such as a bolt or the like being inserted into the mounting location and attached to the floor under the bed. The fastener pockets 32 of the bed also accept tie down buckles 45 for use in psychiatric applications.

Figure 3:
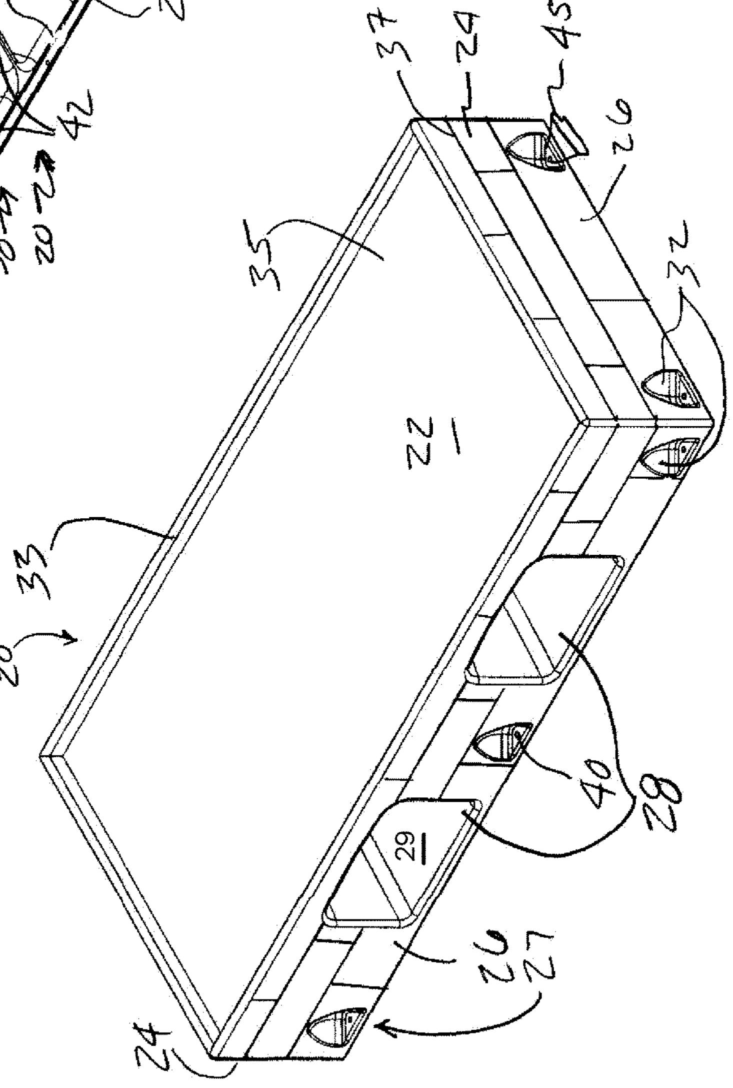
FIG. 3 is a perspective view of an second embodiment of an intensive use bed

Referring to FIGS. 3 and 4, the bed 20 illustrated as a second embodiment has a pair of storage openings 28 opening into the front surface 29. The storage surface 29 has a gently sloped storage cavity floor 27 to prevent fluid collection and ease spray cleaning and drying.

Figure 8:
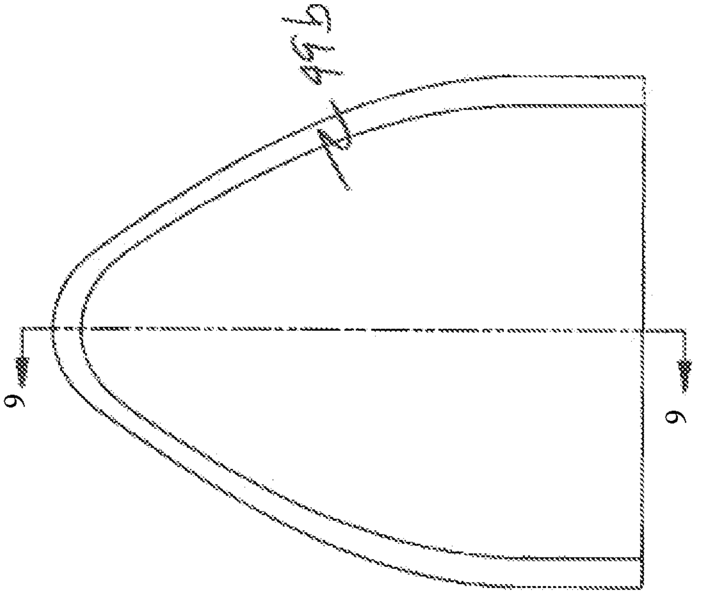
FIG. 8 is a front plan view of a second embodiment of a fastener cover of FIG. 3.

Referring to FIGS. 5 and 8, the fastener pocket 32 is shown having a contoured surface 45 extending to a bolt hole 40 formed from through the mounting surface, shown as mounting flange 46. The mounting flange 46 is formed in each of the fastener pockets 32 having a top side 39 in the fastener pocket 32 adjacent the contoured surface and a bottom side 41 on the bottom surface 34. The fastener hole 40 extends from the top side 39 to the bottom side 41 and is adapted to receive a fastener such as a bolt extending through the mounting flange for attachment to a structure such as the floor F. A metallic or plastic insert 50 may be inserted in fastener hole 44 to provide additional support for the mounting flange 46 to prevent crushing the flange when the bolt is tightened. As illustrated in FIG. 5, contoured cover 49 *a* and in FIG. 8, flat cover 49 *b* are used to hide the bolt to prevent tampering. The cover 49 *a*, 49 *b* is attached by plastic welding or adhesive 51, forming a slightly recessed surface with respect to the walls 24, 26.

Figure 7:
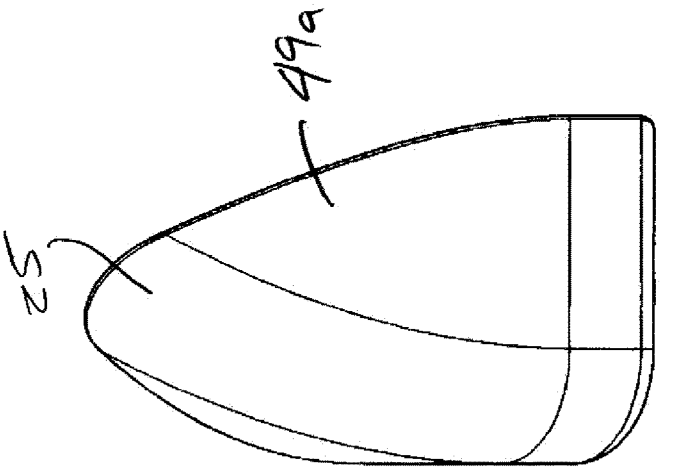
FIG. 7 is a perspective view of the first embodiment of a fastener cover of FIG. 5.
Figure 6:
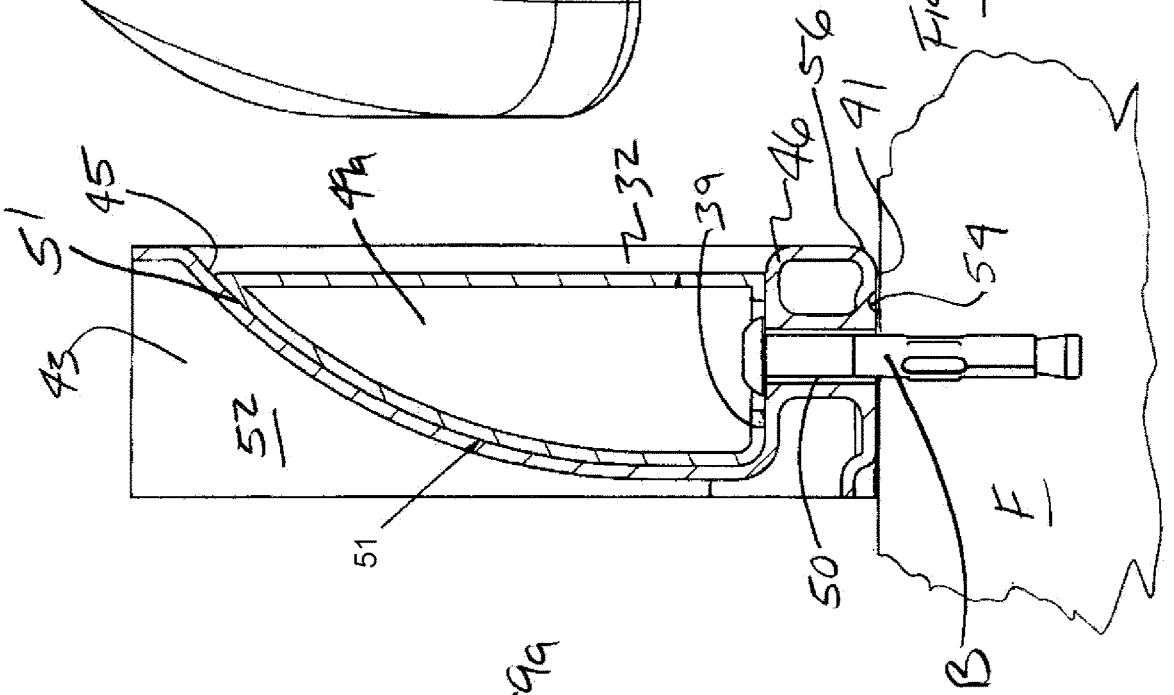
FIG. 6 is a section view taken at 6-6 of FIG. 5 of the first embodiment of a fastener cover.

Referring to FIGS. 6 and 7 the contoured cover 49 *a* has a shape for being received in fastener pocket 32 as shown in FIG. 5.

Figure 10:
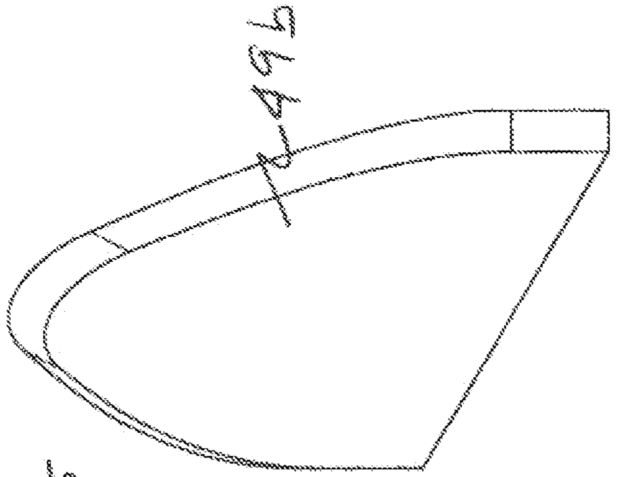
FIG. 10 is a perspective view of the second embodiment of a fastener cover of FIG. 8.
Figure 9:
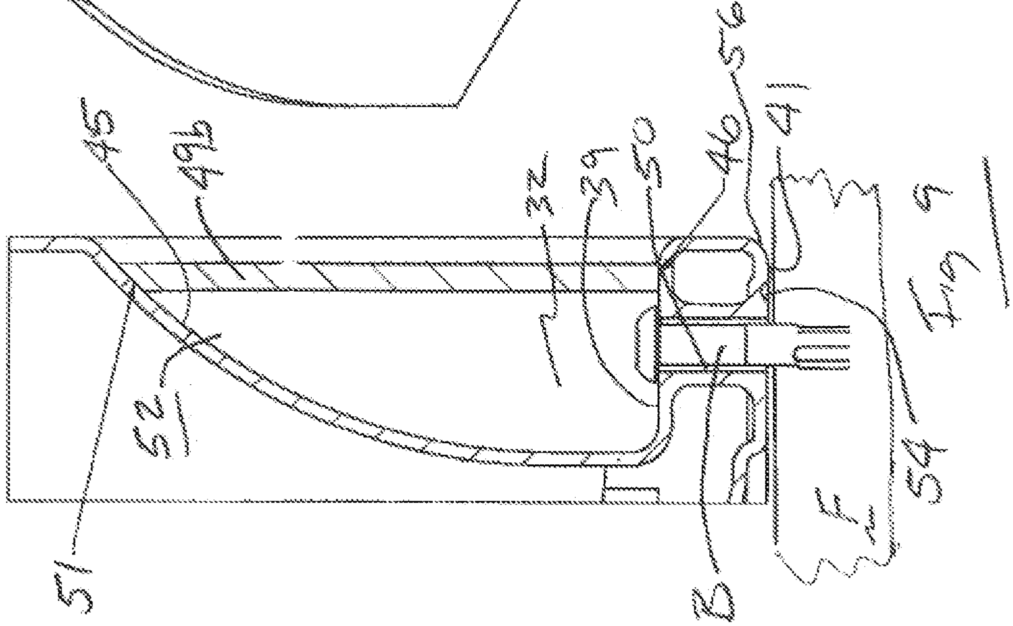
FIG. 9 is a section view taken at 9-9 of FIG. 8 of the second embodiment of a fastener cover.

Referring to FIGS. 9 and 10, the contoured cover 49 *b* has a generally planar shape having a contoured outer edge to fit into and cover the fastener pocket 32 as illustrated in FIG. 8.

Continuing to refer to FIGS. 5 and 8, foam 52 is injected into the generally hollow chambers of the honeycomb structure of the bed 20. A caulk channel or groove 54 is shown intermediate the outer edge 56 of the bottom surface 34 and the fastener hole 40. The caulk channel 54 extends around the entire perimeter of the lower surface. The caulk channel 54 is preferably semicircular in cross sectional shape and preferably has a radius of between 0.07 inches and 0.25 inches.

Referring to FIGS. 11-14, an alternate embodiment of an intensive use furniture component is illustrated as an intensive use nightstand 60. The intensive use nightstand 60 has a top surface 62, a pair of side surfaces 64 and a front surface 68. Front surface 68 is shown having two openings 70 for holding items such as books. Or clothes. Nightstand 60 has rounded corners 72 and a smooth outer surface on the top 62 and sides 64. The nightstand 60 may have a mounting surface on the base 78 and/or the back surface 79. The nightstand is shown having a plurality of fastener holes 76 formed in the base 78.

Figures 11, 12, 13, 14:
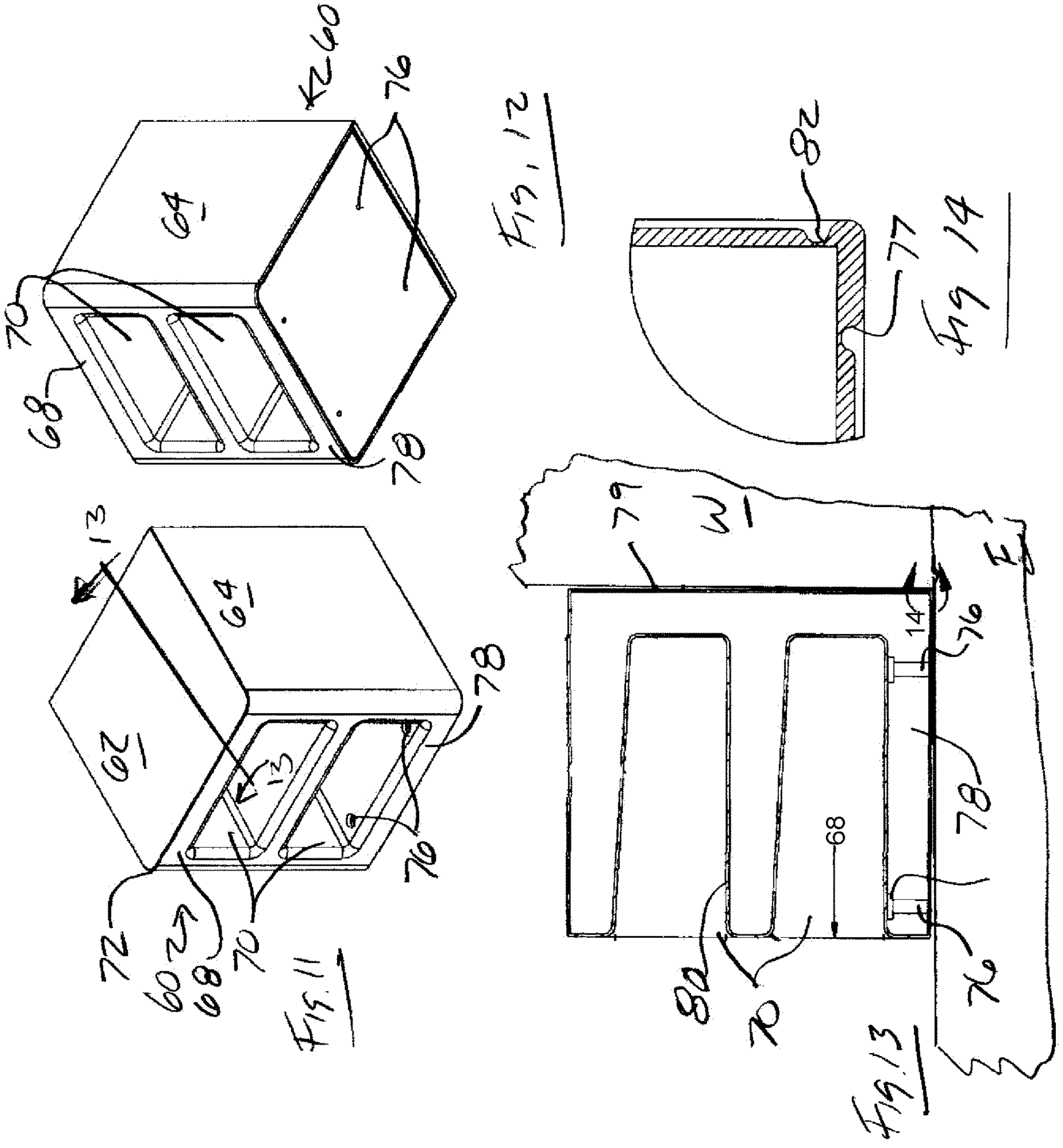
FIG. 11 is a front top perspective view of an intensive use nightstand.
FIG. 12 is a front bottom perspective view of an intensive use nightstand.
FIG. 13 is a section view taken at 13-13 of FIG. 11.
FIG. 14 is a section view taken at section 14 of FIG. 13.

Referring to FIG. 13, a section view of the nightstand 60 is illustrated showing two openings 70 and a generally horizontal lower surface 80 and fastener holes 76 extending from the lower opening 70 through the base 78. An insert may be molded into fastener holes 76 to prevent crushing the base 78 when fasteners are tightened.

Referring to FIG. 14, a caulk channel 77 is illustrated on lower surface 81 of base 78 and the back surface 79. Caulk channel 77 extends around the entire perimeter of base 78 and spaced from the outer edge of the base 78, to sealingly attach the nightstand to the floor in conjunction with fasteners (not shown) extending through fastener holes 76. The caulk channel 77 is preferably formed intermediate the fastener holes 76 and the outside perimeter of the base 78. Alternately, the nightstand may be adapted having a mounting surface on the back surface 79 for attachment to a wall W. Referring to FIG. 14, a detailed view taken from view 14 of FIG. 6 is illustrated showing a caulk channel 82 on the vertical rear surface 79. The caulk channel 82 extends around the entire perimeter of the vertical rear surface 79 for sealingly attaching the nightstand 62 adjacent wall W. The nightstand 60 has gently sloped storage cavities 73 to prevent fluid collection and ease spray cleaning and drying.

Figure 15:
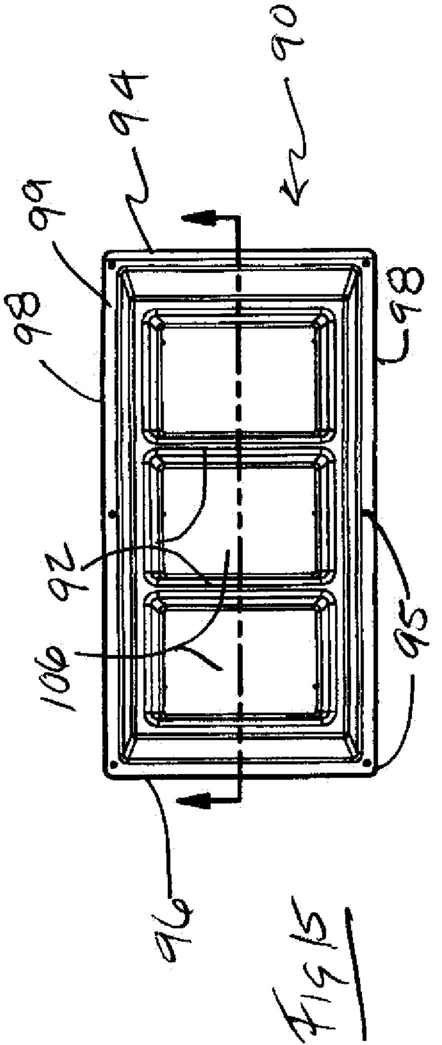
FIG. 15 is a front plan view of an intensive use three shelf wall shelf.
Figure 16:
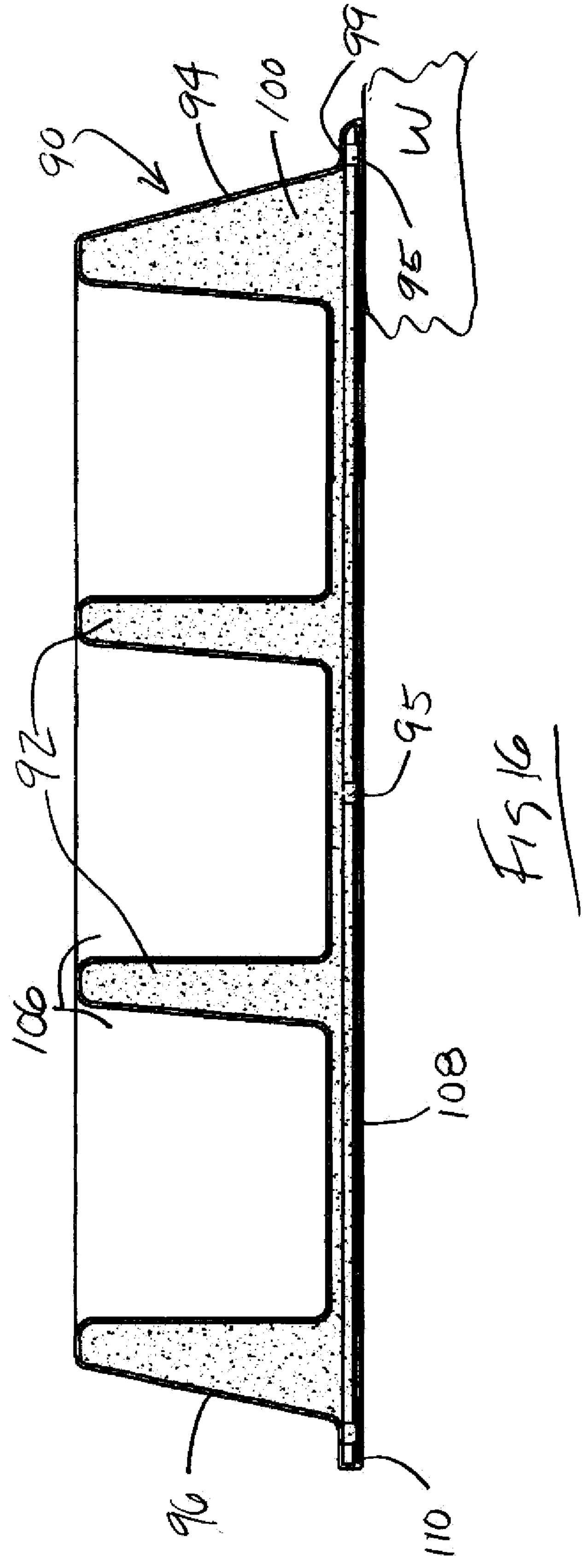
FIG. 16 is a section view taken at 16-16 of FIG. 15.

Referring to FIGS. 15 and 16, a third embodiment of an intensive use furniture component is illustrated as a wall shelf 90. Wall shelf 90 is illustrated as a three-shelf 92 wall shelf, however additional configurations may also be manufactured having more or fewer shelves 92. The wall shelf 90 as a top 94, a bottom 96 and two sides 98. Each shelf 92 extends between the two sides 98 and is defined by the opening between adjacent shelves. The wall shelf 90 is preferably formed by rotational molding forming a hollow outer core 97 that is filled with structural foam 100. A mounting flange 99 is formed around the perimeter of the wall shelf 90 having a plurality of spaced fastener holes 95 for accepting threaded fasteners to attach wall shelf 90 to a wall.

Referring to FIG. 16, a section view of the wall shelf of FIG. 8 is illustrated having shelves 92 defining openings 106. The wall shelf 90 of FIGS. 15 and 16 is generally mounted vertically having a longer vertical length and shorter horizontal width. Top 94 and bottom 96 are formed having non-horizontal surfaces to prevent items from being placed on top of the wall shelf 90 or to resist climbing thereon by the users. A flat rear surface 108 forms a mounting surface adapted to mount against a wall W by fasteners extending through the fastener holes 94. The shelves 92 are gently sloped and form storage cavities to prevent fluid collection and ease spray cleaning and drying.

A caulk channel 110 is formed on the mounting flange 99 for accepting a bead of caulk (not shown) to sealingly attach the wall shelf to the wall W and eliminate any gaps between the wall shelf and the wall.

Figure 17:
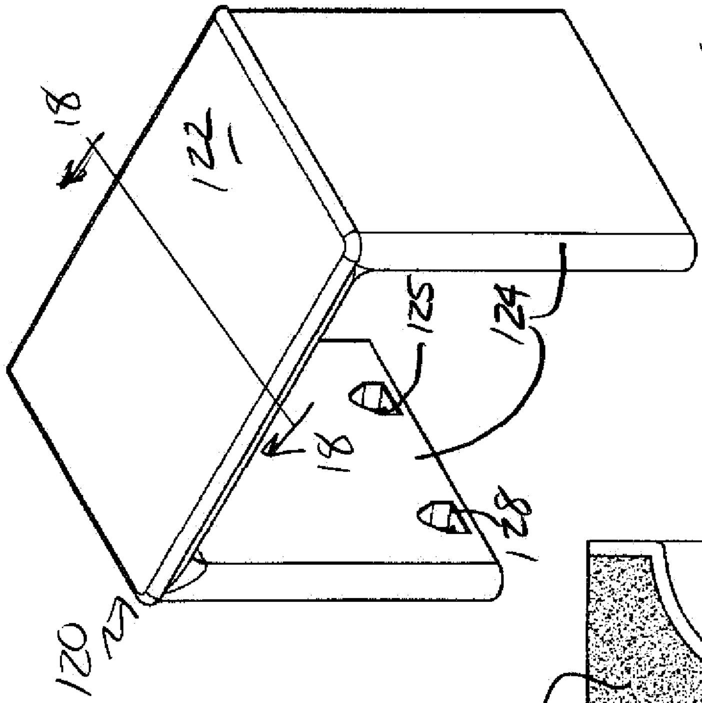
FIG. 17 is a perspective view of an intensive use desk.
Figure 19:
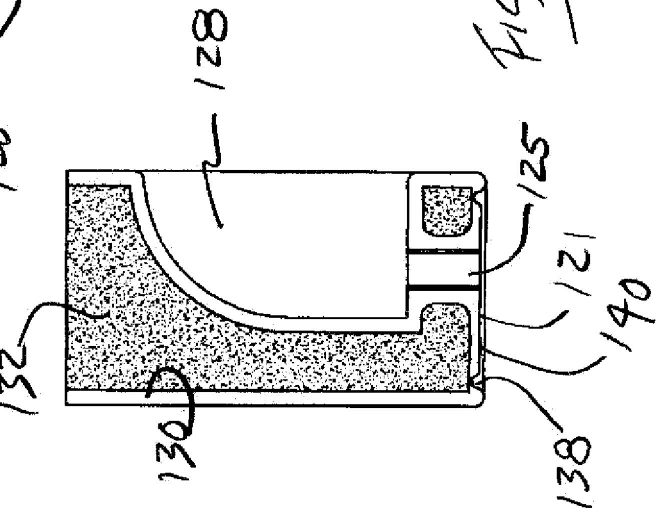
FIG. 19 is a section view taken at 19 of FIG. 18.
Figure 18:
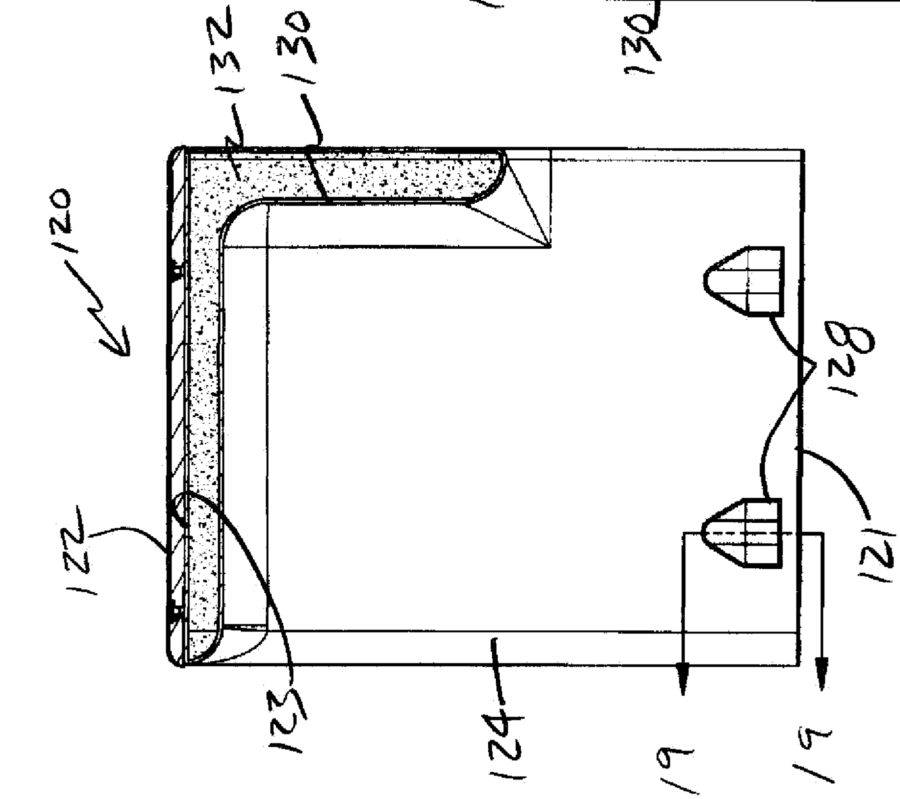
FIG. 18 is a section view taken at 18-18 of FIG. 17.

Referring to FIGS. 17-19 an additional embodiment of an intensive use furniture component is shown as a desk 120. The desk 120 has an upper surface 122 having rounded corners and a pair of support legs 124 and a rear support panel 126. The support legs have a mounting surface 121 on the bottom for attaching to the floor F, the mounting surface having a perimeter surrounding bolt holes 125. A plurality of fastener openings 128 are shown formed in the lower portion of the support legs 124 having the bolt holes extending through the mounting surface to the floor with the head of the bolt adapted to be recessed in the fastener opening 128. As illustrated in FIGS. 18 and 19, the desk 120 may be rotationally molded forming a hollow shell having a core 130 which may be filled with foam 132 such as polyurethane. The upper surface 122 comprises a separately manufactured hard writing surface constructed from one of a high pressure laminate, thermo laminate, wood, plastic sheet or other planar material which may be separately manufactured and attached to the support legs 124. It is anticipated the support legs may further comprise a caulk groove on the top mounting surface 123 attached to the upper surface 122 to provide a contraband barrier between the legs and the writing surface. The writing surface may also be integrally molded with the legs 124.

Referring to FIGS. 17 and 18, the fastener openings 128 are generally scallop shaped openings in the support legs 124. The fastener openings 128 provide a recessed mounting for fasteners extending through fastener hole 134. Referring to FIG. 12, the support legs 124 are preferably formed by a molding process to create a hollow shell 130 which may be filled with the structural foam 132. A caulk channel 138 is formed on the lower surface 140 on each support leg on 24. The caulk channel extends around the perimeter of the floor surface 140 of the support leg. The caulk channel is adapted to receive the bead of caulk for sealing and attaching the desk 120 to the floor. As discussed with respect to the bed 20 above, the fastener openings may be closed with covers to conceal the bolts B (FIG. 6).

Referring to FIGS. 20-24, an alternative embodiment of an intensive use furniture component is shown as a footstool 150. The footstool 150 has a mounting flange 152 surrounding a foot support 154 having a top surface 156. Footstool 150 is secured to a floor surface 158 by fasteners 159 extending through each of a plurality of fastener holes 156 formed in the base. A foam fill hole 157 is formed in the bottom 155 to provide access for blowing in or inserting foam in the footstool hollow shell.

Figure 20:
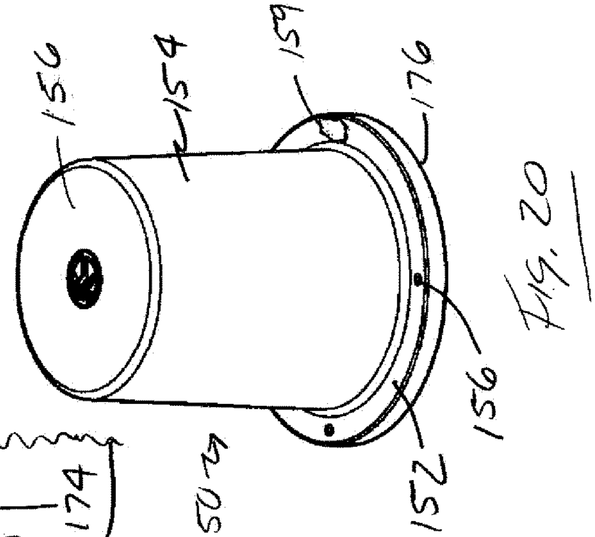
FIG. 20 is a top perspective view of an intensive use footstool.
Figure 21:
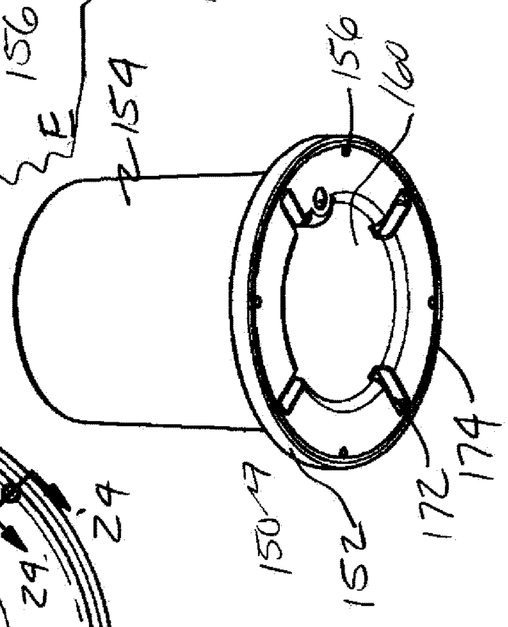
FIG. 21 is a bottom perspective view of an intensive use footstool.
Figure 22:
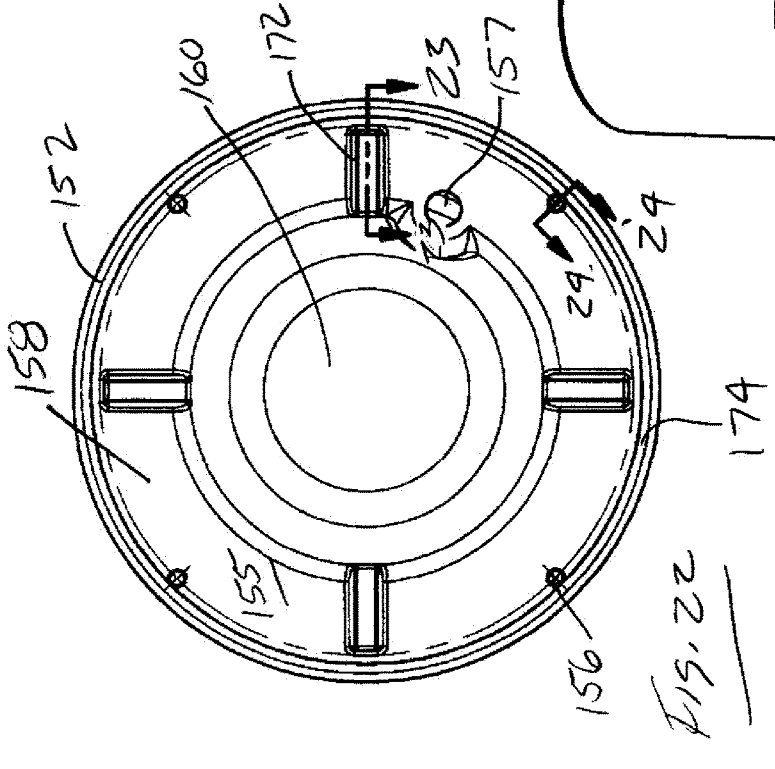
FIG. 22 is a bottom plan view of the intensive use footstool.

As illustrated in FIG. 20, the footstool 150 has a bottom 158 and a hollow interior cavity 160. The footstool 150 may be formed by rotational molding or similar process to form a substantially hollow shell 164 that may be filled with foam 166 (FIG. 15) for support and sound deadening. A central cavity 162 extending from the bottom 158 reduces the amount of material used for forming the footstool 150. Bottom 158 may also comprise a plurality of support ridges 172 adding structural integrity to the mounting flange on 52. The support ridges 172 extend from the central cavity 162 to a position adjacent caulk channel 174. Fastener holes 156 are formed in a circumferential position with respect to the bottom 158. Caulk channel 174 is formed in the bottom 158 intermediate the fastener holes 158 and the outer perimeter 176.

Figure 23:
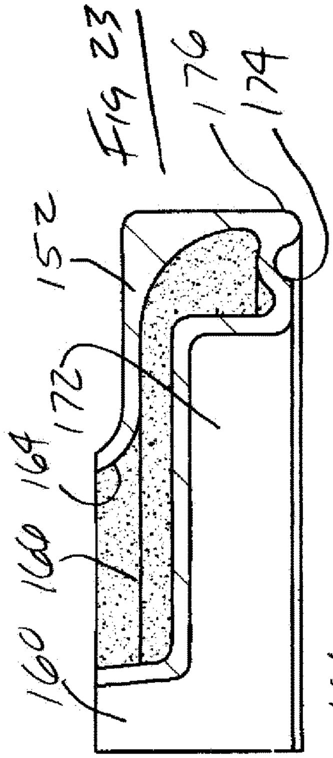
FIG. 23 is a section view taken at 23-23 of FIG. 22.
Figure 24:
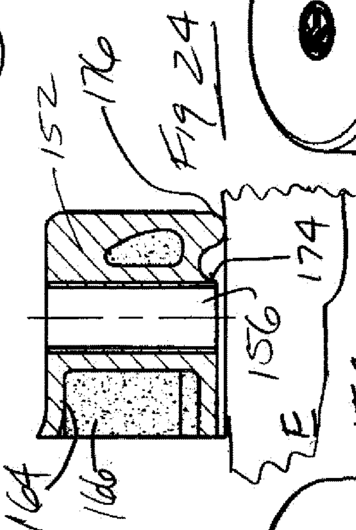
FIG. 24 is a section view taken at 24-24 of FIG. 22.

Referring to FIGS. 23 and 24, foam 166 is used to support the hollow shell 164. The caulk channel 174 is disposed on the bottom 158 adjacent the outer perimeter 176 for receiving a bead of caulk 178 for sealingly attaching the footstool 152 to a floor surface F. The support ridges 172 are molded into the bottom 158 to provide structural support for the base.

Referring to FIGS. 25 to 34, an alternate embodiment of an intensive use furniture component is illustrated as a wardrobe 190 comprising cabinet 191 having a top 192, sides 194, a base 196, a back panel 197 and an optional, at least one door 198 attached to the cabinet 191. The wardrobe 190 is adapted for mounting to a floor surface or an adjacent wall surface of both. The wardrobe 190 has a plurality of fastener openings 200 formed on the top 192 for receiving fasteners to attach to an adjacent wall W. An integrally molded sloped top surface 193 is used to prevent storage and concealment of contraband and further resist climbing. The sloped surfaced could be a separate piece and attached during manufacturing or installation by fasteners or adhesive as is well known n the art of fastening plastic components together.

Figure 25:
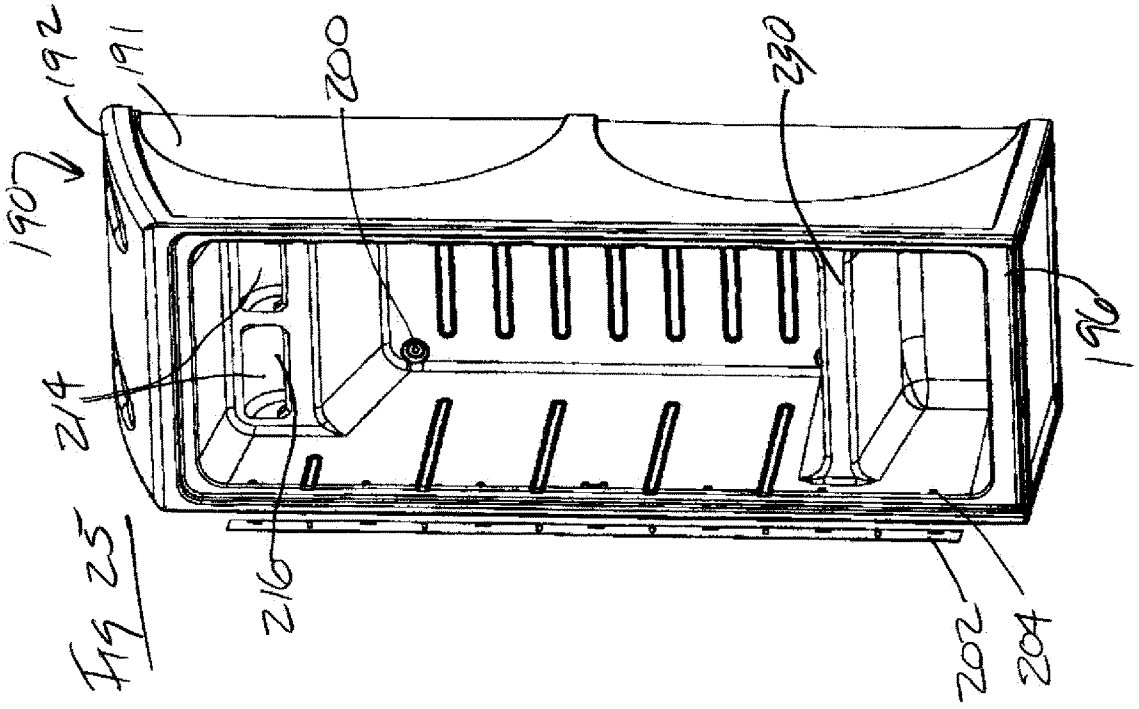
FIG. 25 is a bottom perspective view of an intensive use Wardrobe.

The hinged door illustrated in FIG. 25, preferably uses a piano style hinge 202 to create the strongest and most secure attachment to the wardrobe 190 as illustrated in FIGS. 25, 26 and 28-33. The door may also be reversible as a left or right hinge depending on the installation requirements. A tambour door option may also be considered unique in the field. The door can be molded the same as the other components in the product line or may be different such as HPL (high pressure laminate) laminate, thermoformed laminate, MDF or wood. The door is positioned to allow for complete 270 degree opening around the piano hinge as necessary to prevent overstressing the hinges as shown in FIG. 34. Metal inserts 204 (FIGS. 25, 26 and 28) are used throughout the product to attach the hinges to increase attachment strength and security. A locking means 206 may be included through integrated or separate latch features.

Figure 26:
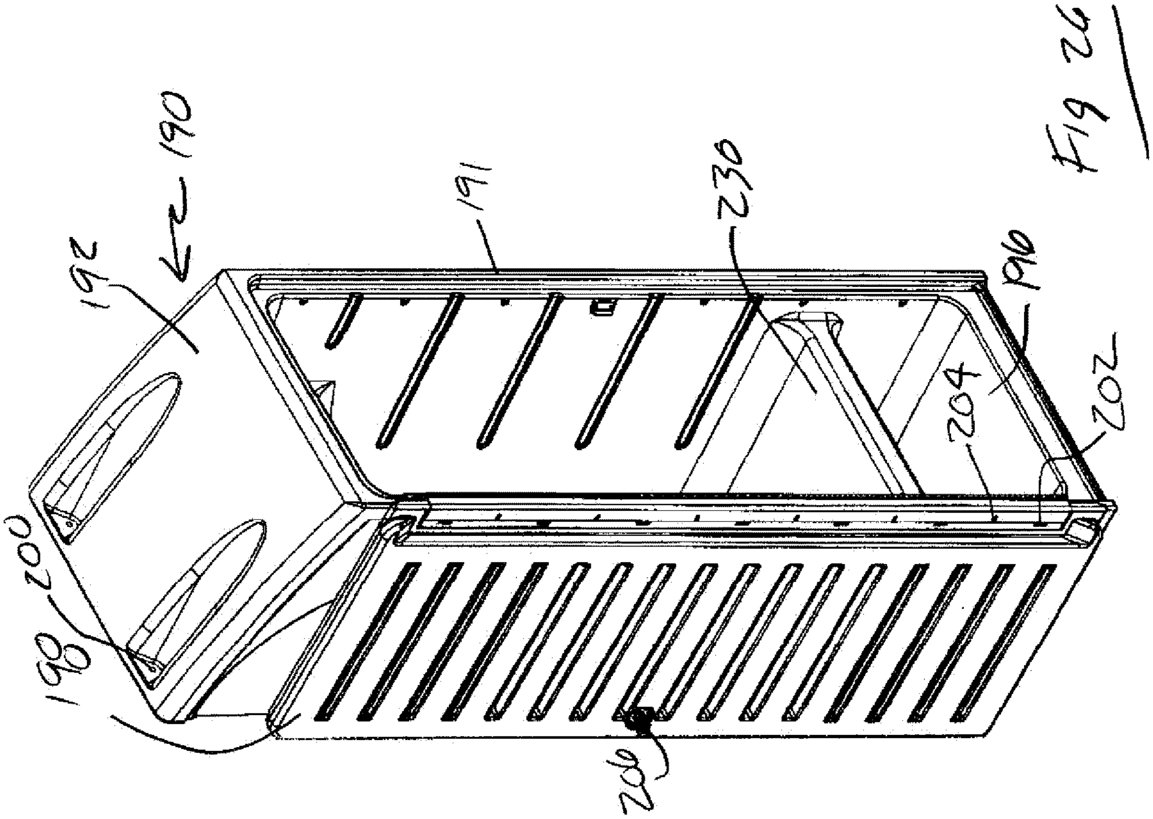
FIG. 26 is a top perspective view of an intensive use wardrobe.
Figures 27, 28, 29, 30, 31, 32, 33, 34:
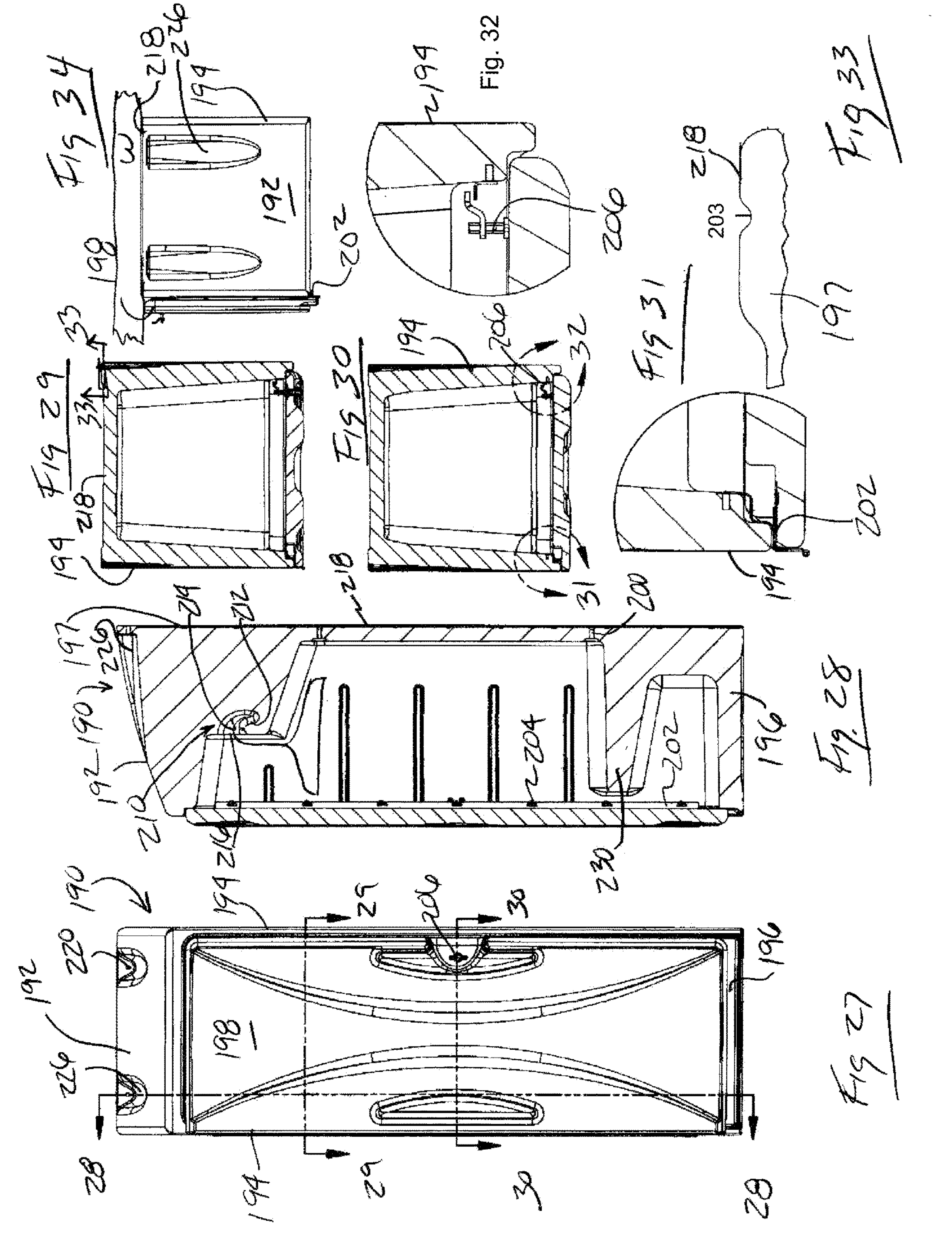
FIG. 27 is a front elevation view of the intensive use wardrobe of FIG. 25.
FIG. 28 is a section view taken at section 28-28 of FIG. 27.
FIG. 29 is a section view taken at 29-29 of FIG. 27.
FIG. 30 is a section view taken at 30-30 of FIG. 27.
FIG. 31 is a detail section view taken at section 31 of FIG. 30.
FIG. 32 is a detail section view taken at section 32 of FIG. 30.
FIG. 33 is a detail section view taken at section 33 of FIG. 29.
FIG. 34 is a top plan view of the intensive use wardrobe of FIG. 26.
Figure 40:
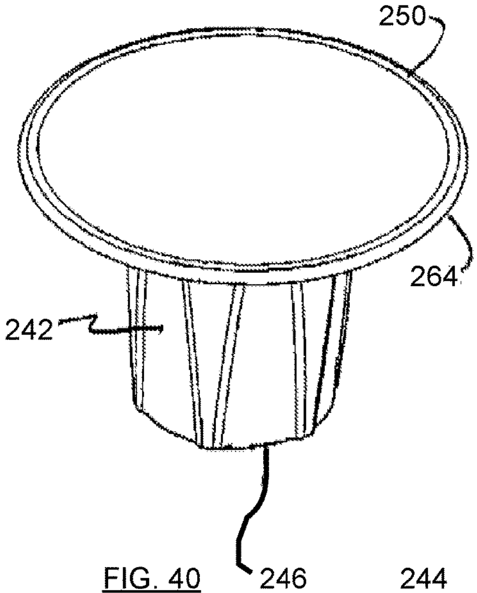
FIG. 40 is a perspective view of an intensive use table having a tabletop attached to a table base.

Referring to FIGS. 26 and 28, the clothes hanging feature 210 is molded as an integral J-bar 212 feature to prevent a traditional bar being used as a ligature support. The geometry of the J-bar 212 is preferred to be integrated into the part, but may be a separate piece fastened into the cabinet 191. A removable piece could be used as a weapon in these intended environments. The cabinet 191 has recessed pockets 214 at the upper portion having internal j-bar 212 on the lower front surface for securely supporting the hook of a standard clothes hanger. The upper portion of the wardrobe 190 is filled to resist hiding contraband or other material above the j-bar 212. A hanger recess 216 is formed between the j-bar 212 and the back 218 of the cabinet 191 to accommodate the hanger. Fastener holes 220 are formed in the back 218 and extend through the back panel 197 which is adapted to be a mounting surface for attachment to a wall W. Contraband barrier 203 is formed in back panel 197 as shown in FIG. 33. Fasteners 224 are extending from inside the cabinet through the back panel to the wall W. Additional fasteners 224 are disposed in fastener pockets 226 on the top of the cabinet 191 as illustrated in FIG. 34. As discussed above, covers may be used to conceal the fasteners and close the fastener pockets 226. A lower shelf 230 is formed in the cabinet 191 forming a storage opening 228 between the shelf 230 and the base 196.

Figure 38:
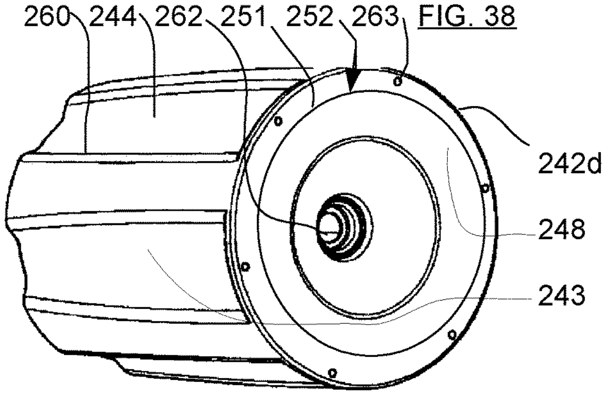
FIG. 38 is a top perspective view of a fourth embodiment of an intensive use table base.
Figure 37:
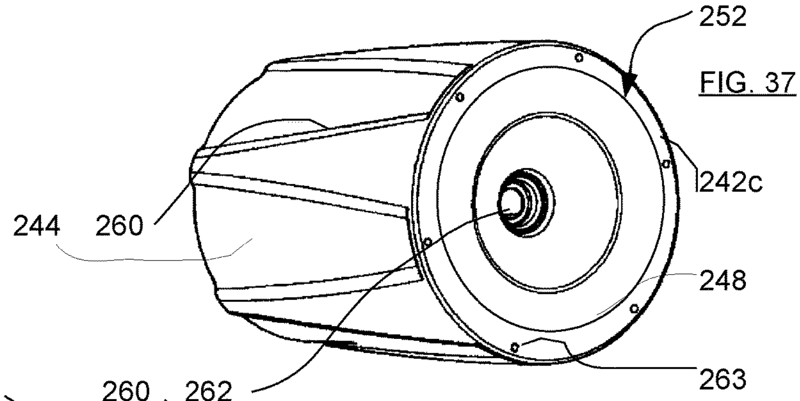
FIG. 37 is a top perspective view of a third embodiment of an intensive use table base.
Figure 39:
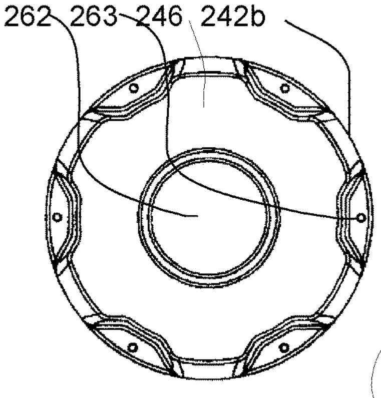
FIG. 39 is a bottom plan view of the second embodiment of an intensive use table base of FIG. 36.
Figure 36:
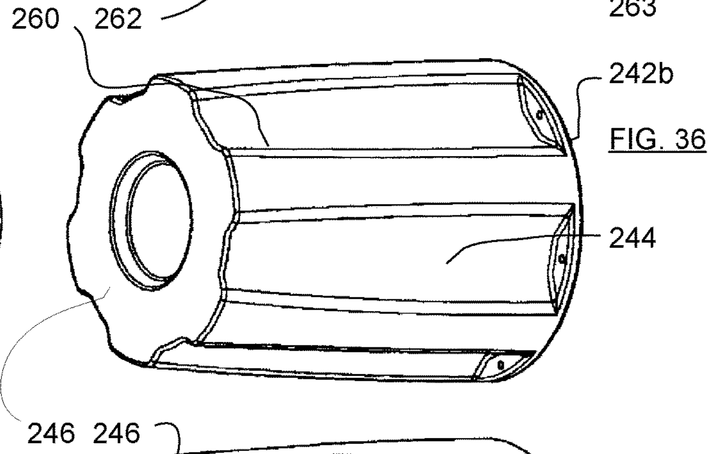
FIG. 36 is a bottom perspective view of a second embodiment of an intensive use table base
Figure 35:
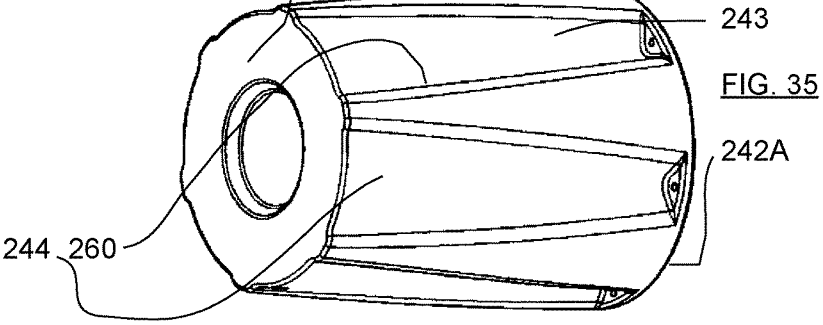
FIG. 35 is a bottom perspective view of an intensive use table base.
Figure 41:
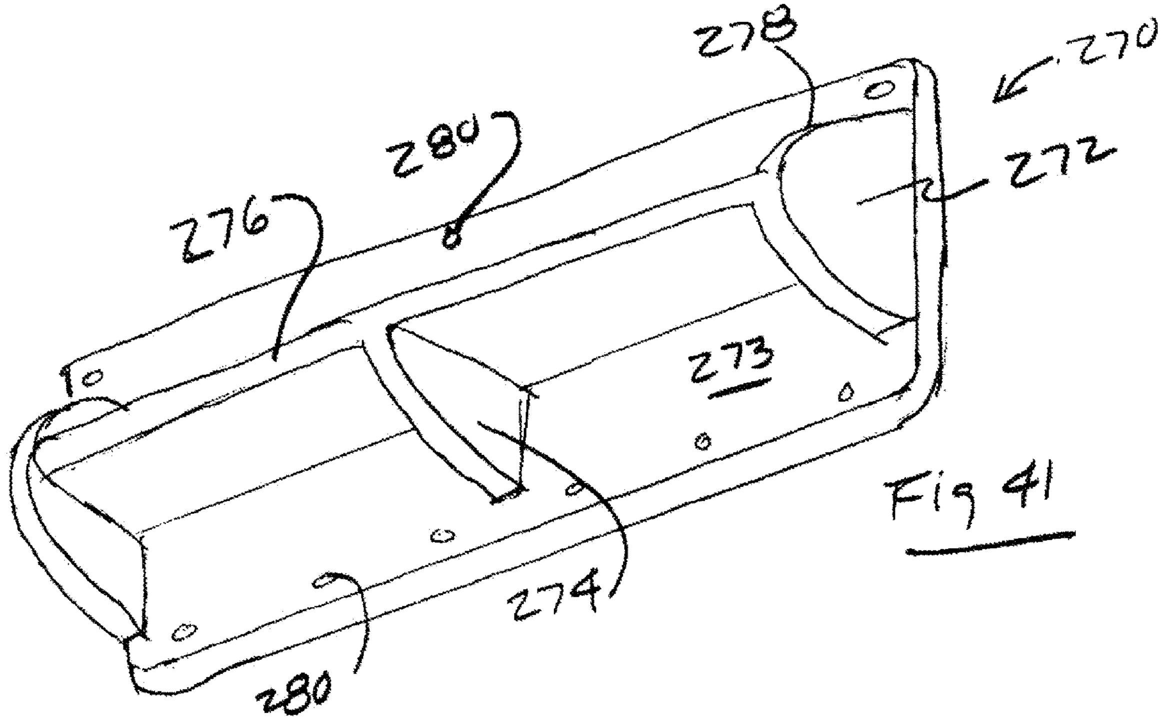
FIG. 41 is a perspective view of a first embodiment of an intensive use bookshelf.
Figure 42:
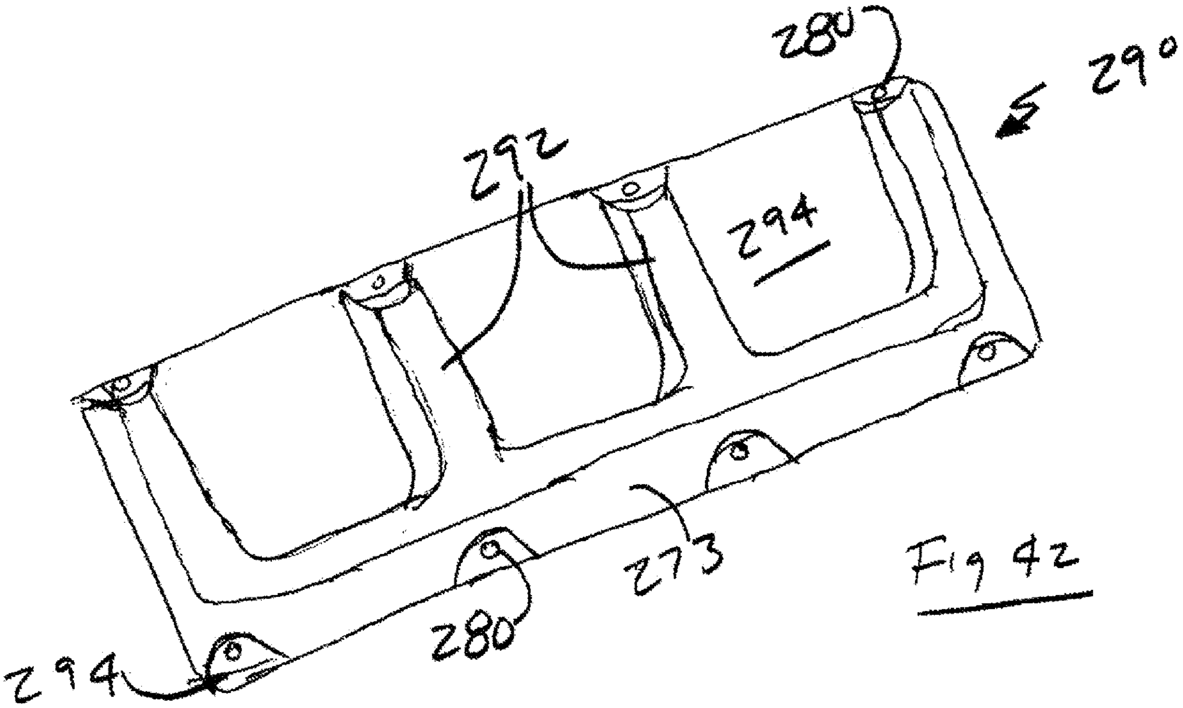
FIG. 42 is a perspective view of a second embodiment of an intensive use bookshelf.

Referring to FIGS. 35-40 an intensive use table 240 is illustrated. The table 240 has a base 242 *a-d* having a vertical wall 243 having an outer surface 244, a floor end 246 and a table top end 248. The tabletop end 248 comprises a mounting surface for attachment to a tabletop 250 (FIG. 20). The mounting surface may have a caulk groove 251 formed therein for acting as a contraband barrier 252. The table base 242 *a-d* may have a contoured outer surface defined by ridges 260 for additional support. The ridges may be linear, parallel, curved or otherwise formed to provide structural support for the As illustrated in FIGS. 37 and 38, the top of the base has a hollow cavity 262 that may be filed with sand during installation. The tabletop 250 is attached by fasteners extending through the base 242 at bolt holes 263 and attaching to the underside 264 of the top 250. The top may be formed as the writing surface of the desk 120 described above.

Referring to FIGS. 49 and 50, an alternate embodiment of an intensive use furniture component is shown as a book shelf 270. Referring to FIG. 49, the bookshelf 272 has a base 273 adapted to support a pair of vertical ends 272 and a support leg 274. Bookshelf 270 may be formed with more or fewer legs 274 depending on its intended use and the size of the shelf 276. Ends 272 and support leg 274 are formed with rounded corners 278 to prevent supporting clothes being hung thereon, a ligature or the like. The shelf 276 is formed with a gently sloping surface angle to allow liquids to run off and facilitate cleaning. Bolt holes 280 are formed in the base 273 to attach the book shelf to the wall W. A caulk bead is formed on the base at the back opposite the shelf 276 as a contraband barrier sealing between the wall W and the base.

Referring to FIG. 50, the bookshelf 290 has upper support legs 292 supporting shelf 276 on base 273. Fastener pockets 294 are formed at the junction of the shelf 276 and base 273. Bolt holes 280 are formed through the base and disposed in the fastener pockets 294. The fastener pockets 294 are adjacent the outer edge of the base 273 facilitating closure of the fastener pocket with a cover as described above regarding the intensive use bed 20.

Referring generally to FIGS. 1 to 17, the intensive use furniture products are preferably rotationally molded in flame retardant, plastic resin with a hollow interior. In the preferred embodiment, the plastic resin may be High Density Polyethylene (HDPE) or Linear Low Density Polyethylene (LLDPE). The resin may contain additives such as flame-retardants to meet government standards. As a means to increase product strength and durability, a secondary material is used to fill the hollow cavities left during the molding process. Molding plastic could be done by rotational, blow, injection, thermo forming or compression molding where one or more pieces may be used to create the hollow cavity.

The secondary material filling the cavities of the molded products may be structural polyurethane foam selected for increased durability and sound absorption. The filler may be injected under pressure and may consist of urethane foam or other material that can conform to the irregular cavities created during the molding process. The filled, rotationally molded products are significantly more impact-resistant, with much greater load-bearing capacity, than the fiberglass predecessors. Because the products are produced from molds, the production capacity increases allow more efficient manufacturing and a product that is less expensive to ship and install.

A fire retardant additive is added to the linear low-density polyethylene and molded into the intensive use furniture products to meetfire rating standards such as the State of California, Technical Bulletin No. 133, Flammability Test Procedure for Seating Furniture for Use in High-Risk and Public Environments.

In the molding process, nylon may be added to the plastic mix for molding the forming the substantially hollow shell to reduce de-lamination between the polyethylene walls and polyurethane foam filler.

Due to the intensive-use nature of the products, the individual components preferably include a means of securely fastening the product to a floor, wall or other desired mounting surface. In the preferred embodiment, the components are typically bolted to a structurally sound mounting surface such as a floor (bed, nightstand, stool) or a wall (Wardrobe, wall shelf, wall storage units) through molded-in bolt hole locations. Additionally each mounting position may be reinforced with metal inserts disposed in the bolt holes by insertion during the molding process or during finishing operations, to prevent crushing of the plastic surrounding the bolt holes or on a mounting flange.

To facilitate a tighter fit to the floor and eliminate gaps, each product features a semicircular shaped, hidden caulk channel on the underside of the unit, along the outer edge and preferably around the entire mounting surface forming a closed circuit of caulk adjacent the perimeter of the mounting surface. The caulk channel has a diameter profile to accommodate a standard bead of sealant such as caulk to seal any seams between the intensive use furniture and the mounting surface, the size of which may vary with the particular components. This allows the end-user to seal the floor and back edges of wall or floor mounted products to prevent concealment of contraband, prevent fluids from penetrating the surface mounting areas and facilitate cleaning of the component and surrounding areas.

The present invention has been shown and described with reference to the foregoing exemplary embodiments. It is to be understood, however, that other forms, details, and embodiments may be made without departing from the spirit and scope of the invention which is defined in the following claims.

We claim:

1. An intensive use wardrobe comprising a one piece cabinet, the cabinet comprising a ligature resistant top, two sides, a base, a storage opening, a ligature resistant clothes hanger support comprising a recessed pocket, a shelf and a back panel, the shelf disposed between the sides, the base adapted for mounting on a floor surface, the ligature resistant clothes hanger support spaced from the two sides and below the ligature resistant top.

2. The intensive use wardrobe of claim 1, further comprising a door on the cabinet, the door further comprising a locking means.

3. The intensive use wardrobe of claim 1, wherein the recessed pocket is in an upper portion of the cabinet.

4. The intensive use wardrobe of claim 1, wherein the ligature resistant clothes hanger support further comprises a hanger support spaced from the back.

5. The intensive use wardrobe of claim 1, further comprising a plurality of fastener holes in the back panel whereby the cabinet is adapted for attachment to a wall.

6. The intensive use wardrobe of claim 1, wherein the cabinet comprises a hollow outer shell.

7. The intensive use wardrobe of claim 1, wherein the ligature resistant top disposed on the back panel, the shelf spaced from the ligature resistant top.

8. The intensive use wardrobe of claim 7, wherein the storage opening disposed between the sides.

9. The intensive use wardrobe of claim 1, wherein the ligature resistant top comprises a sloped surface.

10. The intensive use wardrobe of claim 9, wherein the ligature resistant top comprises a ligature resistant sloped top surface, the sloped top surface on the sides and the back panel.

11. The intensive use wardrobe of claim 1, further comprising a mounting surface, a contraband barrier on the mounting surface, the contraband barrier comprising a caulk groove.

12. The intensive use wardrobe of claim 1, further comprising a fastener opening in the back panel whereby the cabinet is adapted to mount to a wall.

13. The intensive use wardrobe of claim 2, wherein the door is attached to the cabinet by a piano hinge.

14. The intensive use wardrobe of claim 2, further comprising a hinge on the door, the hinge on the cabinet wherein the door is adapted to swing more than 180 degrees.

15. An intensive use wardrobe comprising:

a cabinet comprising a one piece hollow outer shell having a ligature resistant top and a ligature resistant hanger support, the cabinet further comprising a storage shelf, a back wall, a base and a pair of sides, the ligature resistant top on the back wall, the storage shelf on the back wall, the pair of sides on the back wall and on the storage shelf, the pair of sides spaced from each other, the ligature resistant hanger support comprising a recessed pocket spaced from the first and second side walls and disposed below the ligature resistant top, the storage shelf spaced from the top, the storage shelf spaced from the base, the ligature resistant top comprising a sloped surface.

16. The intensive use wardrobe of claim 15, further comprising a door and a hinge, whereby the door is attached to the cabinet by the hinge.

17. An intensive use wardrobe comprising:

a one piece hollow outer shell having a door, a ligature resistant top and a ligature resistant hanger support comprising a recessed pocket, the outer shell further comprising a storage shelf, a back wall, a base and a pair of sides, the ligature resistant top on the back wall, the storage shelf on the back wall spaced from the top, the pair of sides on the back wall, each one of the pair of sides spaced from the other one of the pair of sides, the storage shelf spaced from the top, the storage shelf spaced from the base, the ligature resistant top comprising a sloped surface, the ligature resistant clothes hanger support spaced from the top, the ligature resistant clothes hanger support in spaced relation to each of the pair of sides the door further comprising a hinge and a lock, the hinge on the door, the hinge on one of the pair of sides, the door adapted to bear against the other of the pair of sides, the lock on the door.

* * * * *